（12) United States Patent
Last et al.

(10) Patent No.: US 6,896,287 B2
(45) Date of Patent: May 24, 2005

(54) HYBRID GAS GENERATOR

(75) Inventors: Detlef Last, Mühldorf (DE); Wolfram Seebeck, Schönau (DE); Horst Laucht, Bruckmühl (DE); Johann Seidl, Töging (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 32 days.

(21) Appl. No.: 10/323,225

(22) Filed: Dec. 18, 2002

(65) Prior Publication Data

US 2003/0137132 A1 Jul. 24, 2003

(30) Foreign Application Priority Data

Dec. 20, 2001 (DE) ..................... 201 20 660 U

(51) Int. Cl.[7] .............................................. B60R 21/26
(52) U.S. Cl. ................... 280/736; 280/741; 280/742
(58) Field of Search ............................. 280/736, 737, 280/741, 742; 102/530

(56) References Cited

U.S. PATENT DOCUMENTS

| 5,351,988 | A | | 10/1994 | Bishop et al. |
| 5,639,117 | A | | 6/1997 | Mandzy et al. |
| 5,713,596 | A | * | 2/1998 | Messina et al. ............. 280/737 |
| 5,743,557 | A | * | 4/1998 | Butt ........................... 280/737 |
| 5,984,351 | A | | 11/1999 | Pierotti et al. |
| 6,039,347 | A | | 3/2000 | Maynard |
| 6,412,814 | B1 | * | 7/2002 | Huber et al. ................ 280/736 |
| 6,481,357 | B1 | * | 11/2002 | Lindner et al. ............. 102/530 |
| 6,557,890 | B1 | * | 5/2003 | Karlin et al. ............... 280/741 |

FOREIGN PATENT DOCUMENTS

| DE | 2 300 577 | 7/1973 |
| DE | 195 29 561 C1 | 10/1996 |
| DE | 29813961 | 1/1999 |
| DE | 29920713 | 5/2000 |
| DE | 100 10 589 C1 | 7/2001 |

* cited by examiner

*Primary Examiner*—Paul N. Dickson
*Assistant Examiner*—Toan C To
(74) *Attorney, Agent, or Firm*—Tarolli, Sundheim, Covell & Tummino L.L.P.

(57) ABSTRACT

A hybrid gas generator for use in a vehicle occupant restraint device comprises at least one combustion chamber containing a pyrotechnic charge, and at least one fluid chamber containing a fluid. Several movable pistons are provided which push the fluid out from the at least one fluid chamber. The pistons are able to be set in motion independently of each other and/or in any activation sequence desired.

12 Claims, 1 Drawing Sheet

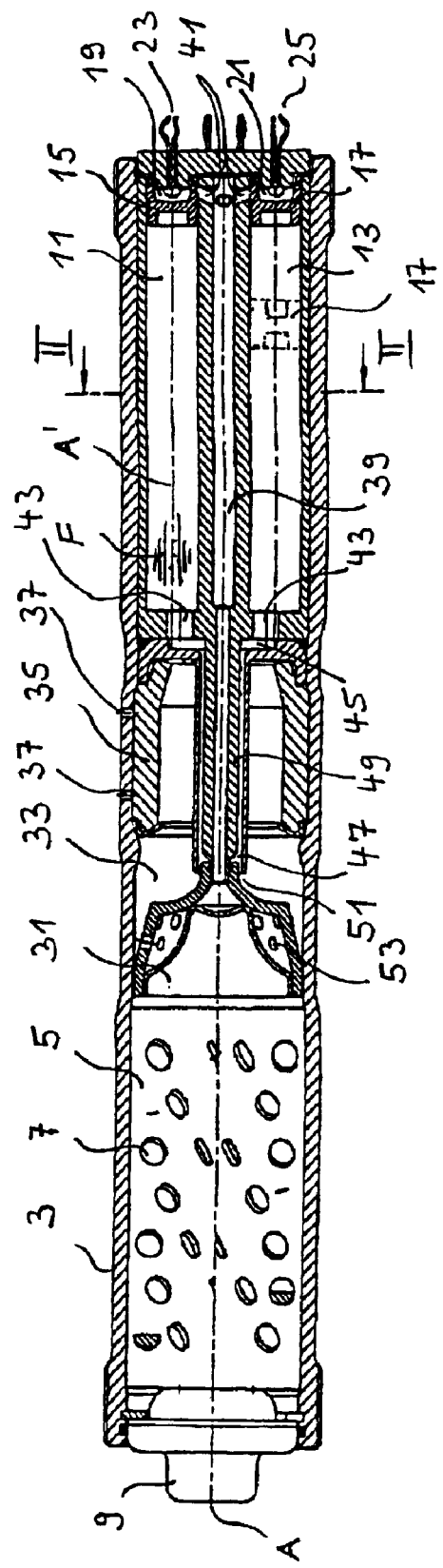
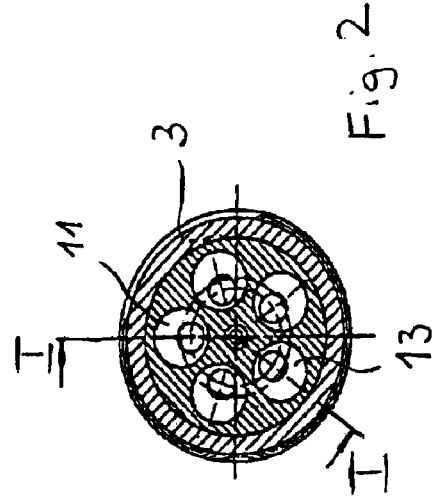
Fig. 1
Fig. 2

HYBRID GAS GENERATOR

TECHNICAL FIELD

The invention relates to a hybrid gas generator, in particular for a vehicle occupant restraint device.

BACKGROUND OF THE INVENTION

Hybrid gas generators usually have at least one combustion chamber containing a pyrotechnic charge, and at least one fluid chamber containing a fluid. In these gas generators, the hot gas occurring through burning of the pyrotechnic charge is to be mixed with the fluid from the fluid chamber, inter alia so that the hot gas is cooled. So that the quantity of admixed fluid, which is combustible or non-combustible, can be varied, it is intended to provide a valve which is positioned for example in the connection between a mixing chamber and the fluid chamber. Such a valve, preferably actuated electromagnetically, requires high current intensities.

The invention provides a very simply constructed hybrid gas generator, operating without high current intensities, in which, nevertheless, the quantity of admixed fluid is variable.

BRIEF SUMMARY OF THE INVENTION

According to the invention, a hybrid gas generator for use in a vehicle occupant restraint device comprises at least one combustion chamber containing a pyrotechnic charge, and at least one fluid chamber containing the fluid. Several movable pistons are provided which push a fluid out from the at least one fluid chamber. The pistons or their drive means are coupled or decoupled from each other in such a manner that they are able to be set in motion independently of each other and in any activation sequence desired. Whereas in prior art there were always provided only one fluid chamber and also only one piston associated therewith, the invention makes provision that several pistons are responsible for the displacing of the fluid from the fluid chamber or fluid chambers. In this way, a valve becomes unnecessary. The pistons can be actuated individually, so that they each lead alone to the displacement of fluid or simultaneously or staggered chronologically, so that various courses of the injected quantity of fluid are able to be achieved over time.

Preferably, each piston is provided with an activation unit, and after actuation of the activation unit, the movement of the associated piston takes place, or the movement is at least permitted. The activation unit can therefore either move the piston itself or permit the movement, for example by gas being admitted into a working space for displacement of the piston.

Preferably, the activation unit is a pyrotechnic igniter, which can be controlled very simply and rapidly, and also with negligible delay can bring about or at least permit a movement of the piston. The switching time which is able to be achieved by a pyrotechnic igniter is very small.

According to the preferred embodiment, one working space including an inlet opening is provided for each of the pistons, the inlet opening being opened by actuation of its associated activation unit, so that hot gas generated in the combustion chamber is able to flow into a respective working space adjoining its associated piston. Thereby, the hot gas, which is under high pressure, provides alone or at least largely for the displacement of the pistons.

In addition, provision can optionally be made that when the activation unit is not actuated, the piston closes its associated inlet opening and, preferably, is displaced by the activation unit on its actuation so far until the inlet opening is opened. The activation units, preferably the igniters, therefore displace the pistons to a minimal extent, in order to merely expose the previously closed inlet openings, so that pyrotechnically generated hot gas can flow into the associated working space.

Although it would be possible for a fluid chamber to be delimited by two pistons, and for these to be actuated independently and selectively, provision is preferably made that several fluid chambers are provided and one displaceable piston is provided in each fluid chamber. The fluid is therefore divided into several chambers and, depending on how much fluid and when how much fluid is to be admixed to the hot gas, several activation units are actuated in varying numbers and, if necessary, staggered chronologically with respect to each other.

If several fluid chambers are provided, it is advantageous if these have a common injection opening to a mixing chamber, which provides for a simple construction of the hybrid gas generator. The hot gas, occurring through the burning of the pyrotechnic material, and the fluid, are introduced into the mixing chamber, as stated.

Alternatively, however, separate injection openings can also be provided for each fluid chamber, or injection openings collected together in groups.

A compact arrangement of the fluid chambers can be achieved when the latter are arranged around an axis of a tubular gas generator housing.

Between the fluid chambers, a central supply channel can be arranged here for hot gas from the combustion chamber, each fluid chamber having associated with it a working space that adjoins the piston delimiting it, and each working space being in flow connection with the supply channel via an inlet opening, at least when the corresponding piston has been set in motion. In this connection, "at least" means that optionally also each working space can be in flow connection with the supply channel when the piston is not moving, in the basic position, as it were.

BRIEF DESCRIPTION OF THE DRAWINGS

FIG. 1 shows a longitudinal sectional view through an embodiment of the hybrid gas generator in accordance with the invention according to line I—I in FIG. 2 and FIG. 2 shows a cross-sectional view through the hybrid gas generator along line 11—11 in FIG. 1.

DETAILED DESCRIPTION OF THE PREFERRED EMBODIMENT

In the Figures, there is illustrated a hybrid gas generator for inflating a gas bag in a motor vehicle. The hybrid gas generator has an elongated tubular housing 3 with an axis A. At one axial end, inside the gas generator a combustion chamber 5 is provided, which is filled with a pyrotechnic charge 7 in the form of propellant tablets. Reference number 9 designates an igniter for igniting the charge 7.

At the opposite end, several fluid chambers 11, 13 are arranged so as to be uniformly distributed about axis A, and contain a combustible and/or non-combustible fluid F; only the two fluid chambers 11, 13 are provided with reference numbers, the remaining three fluid chambers which can be seen in FIG. 2 do not bear a reference number, but are constructed in an identical manner, however, to the fluid chambers 11, 13. The central axes A' of the fluid chambers 11, 13 and of the remaining fluid chambers lie, viewed in cross-section according to FIG. 2, on a circle about the axis A.

Each of the fluid chambers 11, 13 and the remaining fluid chambers which are not provided with reference numbers have their own piston 15 or 17 associated with them, which is H-shaped in cross-section. On the side of the piston 15 facing away from the fluid chamber, a working space 19, 21 adjoins each piston, into which space 19, 21 one igniter 23, 25 each projects. Therefore, as a whole, five fluid chambers, five pistons and five pyrotechnic igniters are provided. The igniters are connected with a control unit, which is not shown, and can be addressed separately from each other and independently of each other and hence activated. Each igniter forms an activation unit for the associated piston and its fluid chamber. Between the fluid chambers and the combustion chamber 5, starting from the combustion chamber 5, an expansion space 31 for hot gas occurring on burning of the charge 7, and an adjoining mixing chamber 33 are arranged. In the mixing chamber 33, the hot gas and injected fluid F are mixed. In the mixing chamber 33 also a tubular filter 35 is arranged upstream of radial outflow openings 37.

A central supply channel 39 for hot gas extends along axis A from the expansion chamber 31 up to the opposite end of the gas generator, from where outlet openings 41 connect the supply channel 39 with all the working spaces, inter alia also with the working spaces 19, 21. In the state which is shown, the inlet openings 41 to the working spaces 19, 21 are closed, however, by the pistons 15.

At the end opposite the piston 15, 17, each fluid chamber 11 has an outlet bore 43, the outlet bores 43 opening into a common chamber 45. An annular channel 47, which surrounds the tube 49 in which the supply channel 39 is situated, connects the chamber 45 with the mixing chamber 33. Reference number 51 designates the injection opening of the annular channel 47 into the mixing chamber 33 and hence also the common injection opening of all fluid chambers.

The mode of operation of the hybrid gas generator according to the invention is explained hereinbelow.

As soon as an accident is detected, the igniter 9 is addressed and ignites the charge 7, so that the hot gas which is produced arrives via the expansion chamber 31 and overflow openings 53 into the mixing chamber 33. A portion of the hot gas, however, also flows into the supply channel 39 and into the inlet openings 41. Depending on when and how much fluid F is to arrive into the mixing chamber 33 and is to be admixed with the hot gas, one or more igniters are activated by a control unit at the appropriate moment. As soon as an igniter is activated, a small amount of gas is produced, which brings about an increase in size of the working space and a displacement of the corresponding piston to the left. The displacement here is so great that the respective piston no longer covers the corresponding inlet opening 41 and hot gas can flow into the working space 19. The hot gas, which is under high pressure, then leads to a displacement of the piston up to the outlet bores 43. The fluid F therefore arrives via the chamber 45 into the mixing chamber 33, where it cools and evaporates or burns the hot gas and hence increases the outflowing quantity of gas. The mixed gas which is produced arrives through the filter 35 and the openings 37 into the gas bag, which is not shown. The igniters 23, 25 and the remaining igniters, which are not illustrated, can be activated selectively individually, at the same time or staggered over time, so that via the addressing of the igniters, the injected quantity of fluid and also the course of the injected quantity of fluid can be varied over time.

Electromagnetic valves to control the injected quantity of fluid are not provided. The design is distinguished by a simple, robust construction.

Instead of several igniters 23, 25, which are arranged so as to be separate from each other structurally, a so-called igniter array or micro igniter field can also be used, which is an electronic component in microsystem technology and which is described for example in the DE 201 04 042.

Alternatively, several fluid chambers or only one fluid chamber can be filled with combustible fluid and the remaining fluid chambers can be filled with non-combustible fluid. Furthermore, the fluid chambers 11, 13 and the remaining fluid chambers also do not have to have the same volume or be filled with the same quantity of fluid. By changing these parameters, a mixture ratio of hot gas to fluid can be produced, which is highly variable over time.

What is claimed is:

1. A hybrid gas generator, in particular for a vehicle occupant restraint device, said hybrid gas generator comprising at least one combustion chamber containing a pyrotechnic charge, and several fluid chambers containing a fluid, and several movable pistons, each piston being able to push said fluid out from an associated fluid chamber, said pistons being able to be set in motion selectively and independently of each other to vary the flow of fluid from said several fluid chambers.

2. The hybrid gas generator according to claim 1, wherein each piston is provided with an activation unit which when actuated permits or causes a movement of its associated piston.

3. The hybrid gas generator according to claim 1, wherein said fluid is combustible.

4. A hybrid gas generator, in particular for a vehicle occupant restraint device, said hybrid gas generator comprising at least one combustion chamber containing a pyrotechnic charge, and several fluid chambers containing a fluid, and several movable pistons each of which pushes said fluid out from an associated fluid chamber, said pistons being able to be selectively set in motion to vary the flow of fluid from said several fluid chambers, each of said pistons being provided with a pyrotechnic igniter which when actuated permits or causes a movement of its associated piston.

5. A hybrid gas generator, in particular for a vehicle occupant restraint device, said hybrid gas generator comprising at least one combustion chamber containing a pyrotechnic charge, and several fluid chambers containing a fluid, and several movable pistons each of which pushes said fluid out from an associated fluid chamber, said pistons being able to be selectively set in motion to vary the flow of fluid from said several fluid chambers, each of said pistons being provided with an activation unit which when actuated permits or causes a movement of its associated piston, and one working space including an inlet opening for each piston, said inlet opening being opened by actuation of its associated activation unit so that hot gas generated in said combustion chamber is able to flow into a respective working space adjoining its associated piston.

6. The hybrid gas generator according to claim 5, wherein when said activation unit, is not actuated, said piston closes its associated inlet opening and is displaced by said activation unit so far until said inlet opening is opened.

7. The hybrid gas generator according to claim 4, wherein said fluid chambers are arranged about an axis of a tubular gas generator housing.

8. The hybrid gas generator according to claim 4, wherein arranged between said fluid chambers is a central supply channel for hot gas from said combustion chamber, wherein associated with each fluid chamber is one working space that adjoins said piston delimiting it, and wherein each working space is in flow connection with said supply channel via an inlet opening, at least when said piston has been displaced.

9. The hybrid gas generator according to claim 4, wherein said fluid chambers have different volumes.

10. The hybrid gas generator according to claim 4, wherein said fluid chambers are filled with different fluids.

11. The hybrid gas generator according to claim 4, wherein said fluid chambers are filled with different quantities of fluid.

12. A hybrid gas generator, in particular for a vehicle occupant restraint device, said hybrid gas generator comprising at least one combustion chamber containing a pyrotechnic charge, and several fluid chambers containing a fluid, and at least one movable piston which pushes said fluid out from at least one fluid chamber, said piston being able to be selectively set in motion to vary the flow of fluid from said several fluid chambers, said several fluid chambers having a common injection opening to a mixing chamber, and wherein hot gas occurring by burning of said pyrotechnic material, and fluid are introduced into said mixing chamber.

* * * * *